United States Patent [19]

Olivas

[11] Patent Number: 5,118,170
[45] Date of Patent: Jun. 2, 1992

[54] STORAGE AND DISPLAY DEVICE FOR COMPACT DISCS

[76] Inventor: Michael Olivas, 3300 S.W. 14th Pl., Boynton Beach, Fla. 33426

[21] Appl. No.: 713,887

[22] Filed: Jun. 12, 1991

[51] Int. Cl.[5] .............................................. A47B 88/00
[52] U.S. Cl. ..................................................... 312/13
[58] Field of Search ..................... 312/9, 11, 13, 327; 211/40, 41

[56] References Cited

U.S. PATENT DOCUMENTS

| | | | |
|---|---|---|---|
| 3,752,545 | 8/1973 | Schweizer | 312/13 |
| 4,239,307 | 12/1980 | Schweizer | 312/13 X |
| 4,684,019 | 8/1987 | Egly | 312/13 X |
| 4,702,369 | 10/1987 | Philosophe | 312/12 |
| 4,932,522 | 6/1990 | Milovich | 211/40 X |

*Primary Examiner*—Joseph Falk
*Attorney, Agent, or Firm*—Charles J. Prescott

[57] ABSTRACT

A storage and display device for compact disc after removal of the discs from their packaging and protective containers. The device includes a housing having a base panel extending between spaced upright side, front and back panels. A plurality of compact disc holders are pivotally connected to the base panel and arranged closely spaced one to another in a row. Each holder releasibly retains at least one compact disc and is positionable either forwardly, supported by the front panel or rearwardly, supported by the rear panel and includes a cover pivotally connected thereto for protectively covering the compact disc when enclosed between the cover and holder. The holders may be separately removable from the base panel to facilitate removal and replacement of compact discs and art work which accompanies the compact disc.

8 Claims, 3 Drawing Sheets

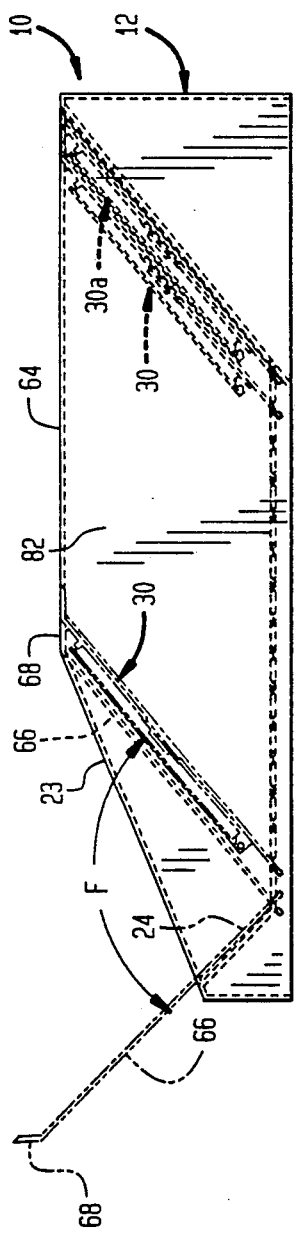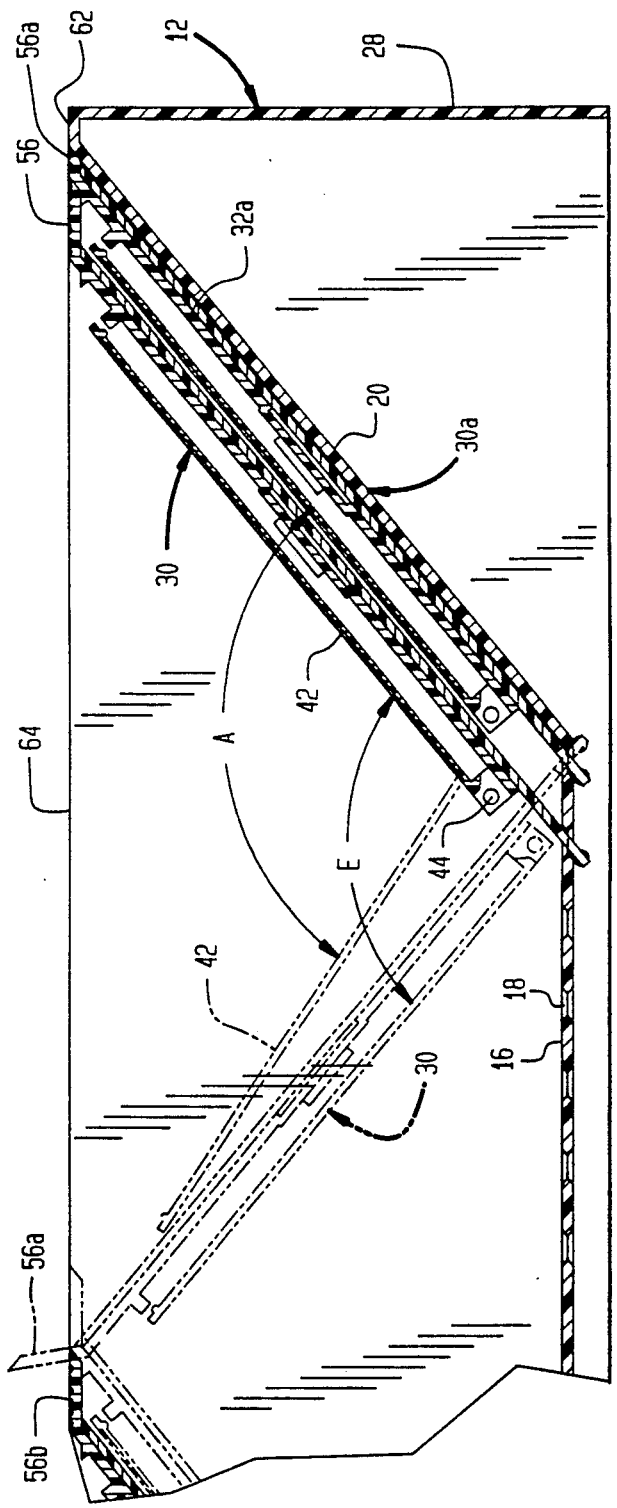

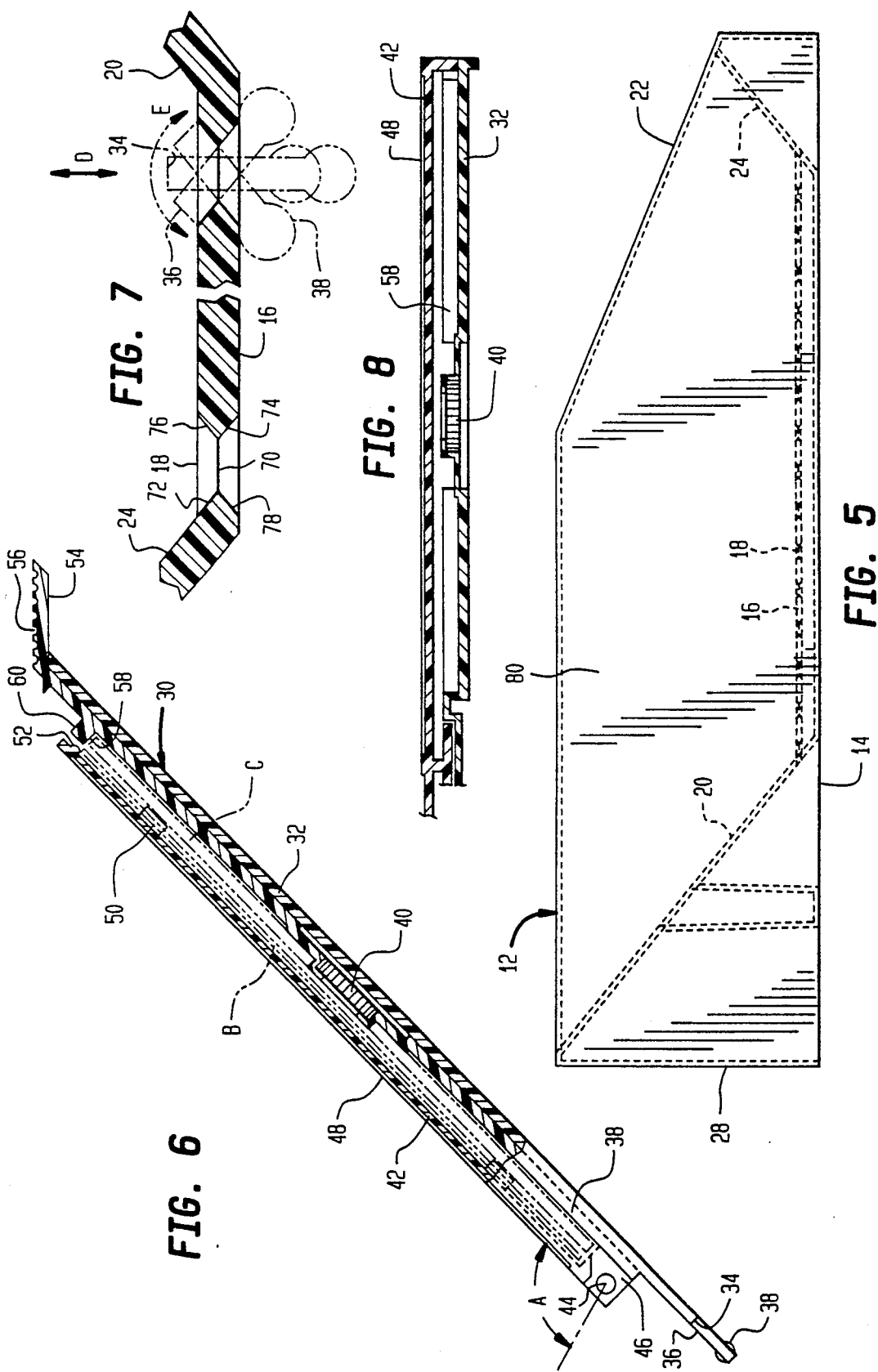

STORAGE AND DISPLAY DEVICE FOR COMPACT DISCS

BACKGROUND OF THE INVENTION

This invention relates generally to devices for storing and displaying compact discs, and more particularly to such a device which retains and displays the contact discs themselves separate and apart from their protective containers or packaging.

A number of devices are known in prior art for protectively housing or containing compact discs (or CD's). These devices are as follows:

| | |
|---|---|
| Clemens | 4,903,829 |
| Youngs | 4,850,731 |
| Gelardi et al. | 4,793,480 |
| Herr et al. | 4,881,640 |
| Saito et al. | 4,613,044 |
| Moss | 4,620,630 |
| Frodelius | 4,664,261 |
| Henkel | 4,762,225 |
| Perkowski | 4,863,026 |
| Seifert | 4,817,792 |

These above-referenced devices each provide a separate housing for a compact disc having structural and functional features which are unique to that particular device.

Applicant is also aware of a number of devices which store and/or display compact discs within their protective containers, some of which are described above. Those devices are shown herebelow:

| | |
|---|---|
| Gelardi et al. | 4,850,477 |
| Sacherman et al. | 4,781,292 |
| Milovich | 4,932,522 |
| Factor | 4,867,306 |
| Muenzer et al. | 4,781,423 |
| Drake et al. | 4,655,345 |
| Fouassier | 4,678,245 |
| Hartsfield et al. | 4,779,730 |
| Johnson | 4,723,662 |
| Hehn et al. | 4,889,244 |
| Hunt | 4,940,147 |
| Tompkins | 4,951,826 |
| Mastronardo | 4,842,032 |
| VanNoord | 4,887,725 |

A number of additional prior art devices are known by applicant for packaging or merchandising compact discs by providing additional packaging structure into which the compact disc container which houses the compact disc are protectively wrapped as follows:

| | |
|---|---|
| Moss | 4,694,954 |
| MacTavish | 4,718,547 |
| Hehn et al. | 4,871,065 |

However, applicant is unaware of any storage device for compact discs which stores a plurality of compact discs for protection, display and selection for use wherein the compact discs themselves are separate and apart from any protective packaging or containers now being supplied with compact discs.

The present invention provides for such a device which obviates the need for manufacturers' providing expensive molded plastic containers now being used to merchandise the compact discs. This invention thus provides all of the necessary protective features now desired of these containers supplied with compact discs primarily for the benefit of the end user after purchase of each compact disc.

BRIEF SUMMARY OF THE INVENTION

This invention is directed to a storage and display device for compact discs after removal of the discs from their packaging and protective cases or containers. The device includes a housing having a base panel extending between spaced upright side, front and back panels. A plurality of compact disc holders are pivotally connected to the base panel and arranged closely spaced one to another in a row. Each holder releasably retains at least one compact disc and is positionable either forwardly, supported by the front panel or rearwardly, supported by the rear panel and includes a cover pivotally connected thereto for protectively covering the compact disc when enclosed between the cover and holder. The holders may be separately removable from the base panel to facilitate removal and replacement of compact discs and art work which accompanies the compact disc.

It is therefore an object of this invention to provide a device for storing and displaying compact discs themselves separate and apart from any packaging or protective containers marketed therewith.

It is another object of this invention to obviate the need for manufacturers and/or marketers of compact discs to provide any disposable packaging for compact discs other than that necessary for shipment and merchandise display.

It is yet another object of this invention to provide a device for storing and displaying compact discs which eliminates other special requirements for protectively housing and displaying compact discs after purchase.

In accordance with these and other objects which will become apparent hereinafter, the instant invention will now be described with reference to the accompanying drawings.

BRIEF DESCRIPTION OF THE DRAWINGS

FIG. 3 is a side elevation view of the invention.

FIG. 4 is an enlarged section view of a portion of FIG. 3.

FIG. 5 is an end elevation view of FIG. 1.

FIG. 6 is a broken section view of a removable compact disc holder of the present invention.

FIG. 7 is a broken section view in the direction of arrows 7—7 in FIG. 1.

FIG. 8 is a section view in the direction of arrows 8—8 in FIG. 2.

DETAILED DESCRIPTION OF THE INVENTION

Figure 1:
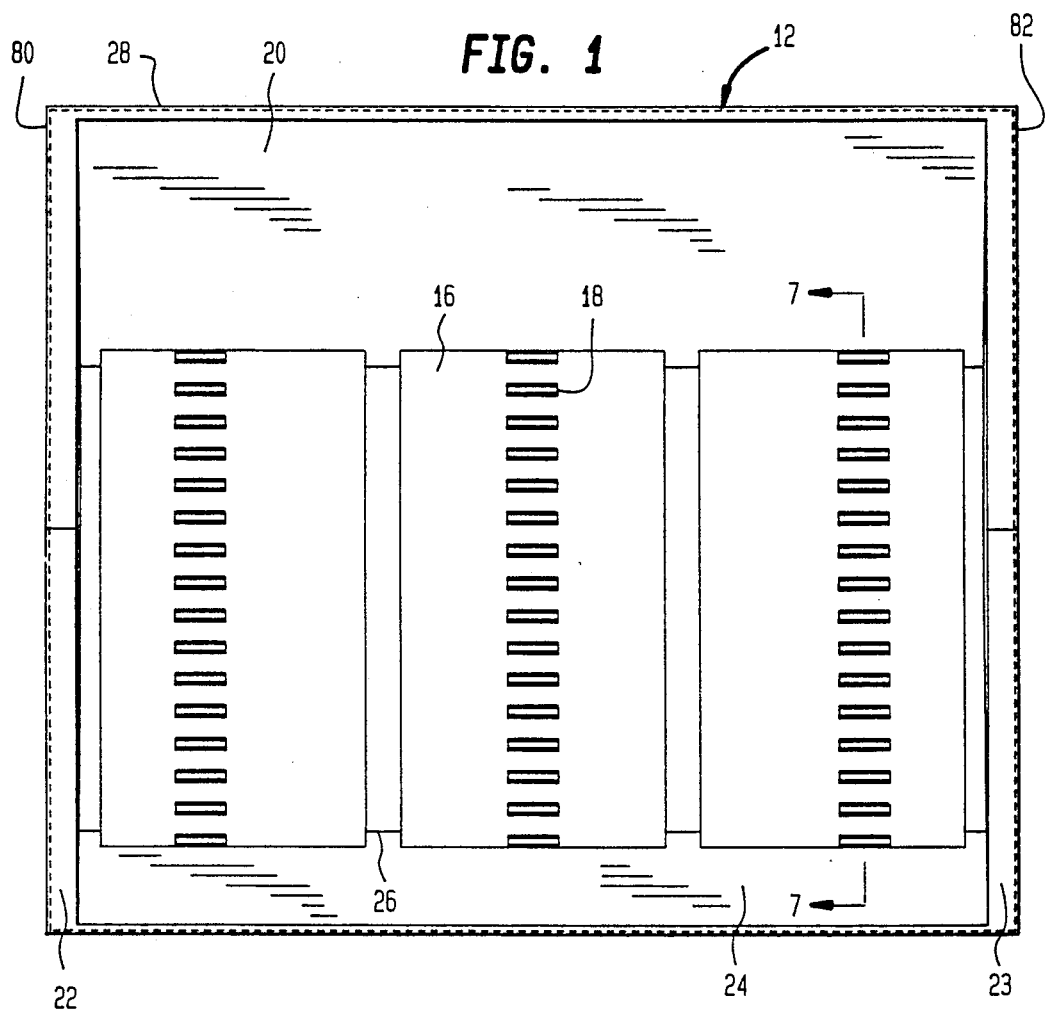
FIG. 1 a top plan view of the housing of the invention.

Referring now to the drawings, and particularly to FIGS. 1, 4 and 5, the housing of the present invention is shown generally at 12 and is molded of transparent thin-walled plastic material. The housing 12 includes a horizontal base panel 16 situated between upwardly extending side panels 80 and 82, forwardly inclined front panel 24 and rearwardly inclined rear panel 20.

Formed into base panel 16 are a plurality of transverse slots 18 oriented in side-by-side alignment in three separate rows as best seen in FIG. 1. Each of these slots 18 is structured to pivotally receive a compact disc holder as will be described herebelow.

Figure 2:
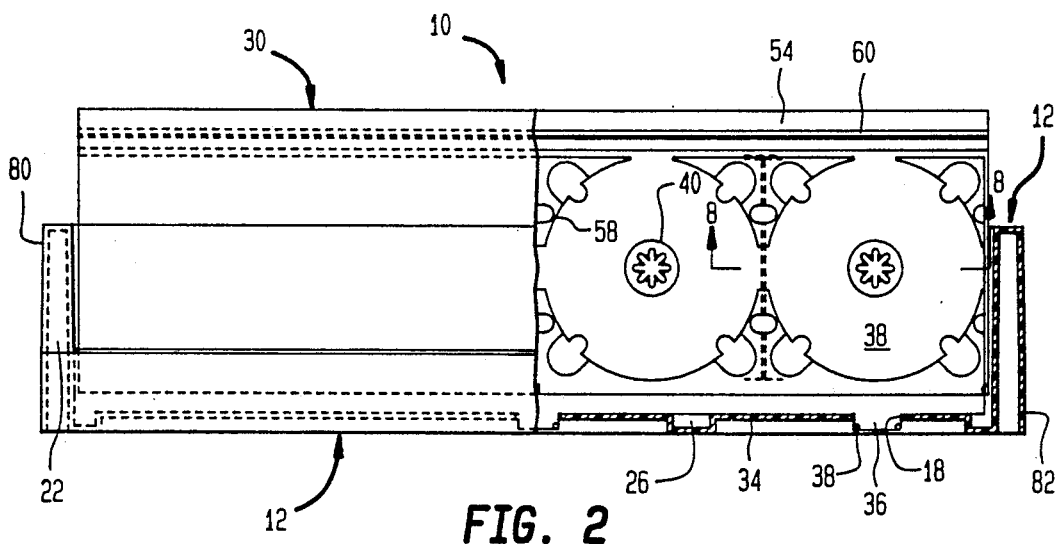
FIG. 2 is a front elevation partial broken section view of FIG. 1 with a holder of the invention installed within the housing in an upright position.

Referring additionally to the remainder of the figures, the compact disc holder is shown generally at numeral 30, the invention shown generally at numeral 10 including the molded housing 12 as previously described and a plurality of holders 30 pivotally assembled thereto. Each holder 30 includes a plurality of cavities 58 formed into panel 38 and sized to receive a compact disc C placed therein. The compact discs C are retained within each cavity 58 by compact disc hubs 40 which releasably engage within an aperture formed into each compact disc C in a well-known manner. Each holder 30 is structured to house a plurality, and preferably four, compact discs C in close, side-by-side relation as best seen in FIG. 2.

Each panel 38 is connected to a support panel 32 which includes a plurality of tabs 36 disposed along the lower margin of support panel 32. Each tab 36 includes retaining beads 38 which cooperate within slots 18 as best seen in FIG. 7. The retaining beads 38 are sized to closely fit through the narrow mid portion 70 of slot 18 downwardly in the direction of arrow D. Shoulder 34 then contacts against the upper surface of base panel 16 and allows the entire holder 30 to articulate backward and forward as shown typically in the direction of arrow E in FIGS. 4 and 7. Each slot 18 includes beveled side walls 72, 74, 76, and 78 which cooperate to stop and support each holder 30 either in a forwardly position generally parallel to front panel 24 or in a rearwardly, stored position generally parallel to rear panel 20.

By the arrangement shown in FIG. 7, each of the holders 30, then may be both manually pivoted back and forth, as well as being easily removed by lifting upwardly in the direction of arrow D so as to facilitate removal or storage of the compact disc C within holder 30.

Each holder 30 also includes a cover 42 which is pivotally connected at its lower end by pins 44 to panel 38 at boss 46. These covers 42 are thus pivotable in the direction of arrow A about pins 44 to facilitate access to the compact discs C without removal of the entire holder 30, if desired.

These covers 42 are preferably formed of transparent plastic as is the entire holder 30. Covers 42 also include alternate means for storing and displaying the artwork or brochures B which accompany compact discs C within their merchandising packaging. One means for retaining these brochures B is within opposing clips 50 positioned along each upright margin of cover 42. Alternately, a thin cavity 48 is formed into the forwardly facing surface of cover 42 of a depth and profile sufficient to receive the thickness of the brochure or artwork.

Referring particularly to FIGS. 3, 4 and 6, the pivotal opening and closing of covers 42 and the pivotal movement of each holder 30 (typ.), the forwardmost cover 66, and rearwardmost holder 30a respectively is there shown. Each holder 30 and 30a includes an elongated flange 56 or 56a respectively having transverse ribs formed in their upper surfaces as shown. When these holders 30 and 30a are in their rearward position and parallel to back panel 20, the flanges 56 and 56a cooperate form a continuous top panel 64 which covers and encloses the contents of the device, namely the compact discs C and the brochures B.

When access to the compact discs C is desired, the user simply, by thumb pressure into ridges 56, pivotally moves one or more of the holders 30 and 30a forwardly in the direction of arrow E. Thereafter, a particular cover 42 may be pivoted forwardly in the direction of arrow A to allow access for removal of the compact disc C and/or brochure B selected.

A front cover 66 is also provided which is pivotally connected to the forwardly most line of slots 18 and serves to cover the contents of the forwardly most folder 30 and to present the appearance of a fully enclosed device 10 when not in use. This front cover is pivotally connected to the base panel as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A storage and display device for storing compact discs when separated from their compact disc protective cases comprising:

a housing having a base panel horizontally extending between spaced upright side, front, and back panels;

said front panel sloping forwardly and said back panel sloping rearwardly from said base panel;

said side panels apart to receive a plurality of compact disc holders, each holder of said plurality of holders structured to include a cavity and a centrally disposed hub cooperatively structured to removably receive a compact disc thereagainst absent the protective case and pivotally connected along a lower edge thereof to said base panel, said plurality of holders arranged in a row with said holders closely spaced one to another;

each said holder having a rearward position generally parallel to said back panel and a forward position generally parallel to said front panel;

a cover pivotally connected to each said holder for protectively covering the compact disc when enclosed by said cover within said holder and for allowing removal of the compact disc from the holder when opened.

2. A storage and display device as set forth in claim 1, wherein:

said holders are releasably connected pivotally to said housing base panel.

3. A storage and display device as set forth in claim 2, wherein each said cover further comprises:

means for supportively receiving a printed graphics brochure.

4. A storage and display device as set forth in claim 2, further comprising:

a flange connected and extending along an upper edge of each said holder;

each said flange cooperating with adjacent said top flanges to form a continuous top panel over said plurality of holders when each said holder is in its rearward position.

5. A storage and display device as set forth in claim 4, wherein:

each said flange includes a ribbed upper surface for facilitating moving each said holder from its rearward to its forward position.

6. A storage and display device as set forth in claim 1, wherein:
each said holder is structured to supportively receive a plurality of compact discs positioned side-by-side in spaced relation one to another.

7. A storage and display device as set forth in claim 6, wherein: said holders are transparent plastic.

8. A storage and display device as set forth in claim 6, wherein:
a front cover pivotally connected along a lower edge thereof to said base panel and positioned between said front panel and said plurality of holder, said front cover structured to cover the compact disc within a forward most said holder.

* * * * *